(12) United States Patent
Utsunomiya et al.

(10) Patent No.: US 10,447,155 B2
(45) Date of Patent: *Oct. 15, 2019

(54) POWER SOURCE DEVICE

(71) Applicants: ABLIC INC., Chiba-shi, Chiba (JP); The Ritsumeikan Trust, Kyoto-shi, Kyoto (JP)

(72) Inventors: Fumiyasu Utsunomiya, Chiba (JP); Takakuni Douseki, Kusatsu (JP); Ami Tanaka, Kusatsu (JP)

(73) Assignees: ABLIC INC., Chiba (JP); THE RITSUMEIKAN TRUST, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/054,692

(22) Filed: Aug. 3, 2018

(65) Prior Publication Data

US 2018/0342949 A1    Nov. 29, 2018

Related U.S. Application Data

(63) Continuation of application No. 15/819,717, filed on Nov. 21, 2017, now Pat. No. 10,075,068.

(30) Foreign Application Priority Data

Nov. 25, 2016   (JP) ................................. 2016-229062

(51) Int. Cl.
*H02M 1/36* (2007.01)
*H02M 3/07* (2006.01)
(Continued)

(52) U.S. Cl.
CPC ............. *H02M 3/07* (2013.01); *H02J 7/0063* (2013.01); *H02M 1/08* (2013.01); *H02J 2007/0095* (2013.01)

(58) Field of Classification Search
CPC ...... H02J 7/0065; H02J 7/0063; H02M 3/157; H02M 1/4225; H02M 2001/007; Y02B 70/126; G05F 1/00
(Continued)

(56) References Cited

U.S. PATENT DOCUMENTS 6,917,188 B2   7/2005  Kernahan
7,030,597 B2 *  4/2006  Bruno ....................... H02J 1/00
                                                        323/299
(Continued)

FOREIGN PATENT DOCUMENTS

EP          0898355 A2    2/1999
EP          2482332 A1    8/2012
(Continued)

OTHER PUBLICATIONS

Extended European Search Report in European Application No. 17203104.9 dated Apr. 12, 2018, pp. 1-9.
(Continued)

*Primary Examiner* — Rajnikant B Patel
(74) *Attorney, Agent, or Firm* — Brinks Gilson & Lione

(57) ABSTRACT

A power source device has: a storage unit configured to receive a generated power and store as a storage power; a boost unit configured to generate, from a storage power supplied from the storage unit, a boosted power having a higher voltage than a voltage of the storage power, and supply the boosted power to a load; and a voltage detection unit configured to output a boost operation permission signal permitting a boost operation of the boost unit to the boost unit when the storage voltage of the boost unit increases to become a voltage equal to or higher than a minimum operation voltage of the boost unit. The boost unit is configured to start the boost operation by the storage power supplied from the storage unit and operates on the boosted (Continued)

power generated by the boost operation as an operation power source when the boost operation permission signal is output from the voltage detection unit.

6 Claims, 5 Drawing Sheets

(51) Int. Cl.
*H02M 1/08* (2006.01)
*H02J 7/00* (2006.01)

(58) Field of Classification Search
USPC .................. 323/222, 224, 211, 282–288
See application file for complete search history.

(56) References Cited

U.S. PATENT DOCUMENTS

| | | | |
|---|---|---|---|
| 7,714,546 B2 | 5/2010 | Kimura et al. | |
| 7,733,069 B2* | 6/2010 | Toyomura | H01R 13/7039 323/256 |
| 9,088,170 B2 | 7/2015 | Kataoka et al. | |
| 9,252,687 B2 | 2/2016 | Ide et al. | |
| 9,673,696 B2* | 6/2017 | Lu | H02M 1/36 |
| 9,735,602 B2* | 8/2017 | Fall | H01L 31/02021 |
| 10,141,837 B2* | 11/2018 | Gao | G06F 1/04 |
| 2006/0152200 A1* | 7/2006 | Kanai | H02J 7/35 323/222 |
| 2010/0149847 A1* | 6/2010 | Kernahan | H01L 31/02021 363/142 |
| 2014/0077756 A1 | 3/2014 | Kataoka et al. | |
| 2014/0268936 A1 | 9/2014 | Lu et al. | |

FOREIGN PATENT DOCUMENTS

| | | |
|---|---|---|
| JP | 2007-181278 A | 12/2007 |
| WO | WO 2006/033142 A1 | 3/2006 |

OTHER PUBLICATIONS

Notice of Allowance in U.S. Appl. No. 15/819,717 dated May 9, 2018, pp. 1-10 and dated Jun. 12, 2018, pp. 1-2.

* cited by examiner

POWER SOURCE DEVICE

RELATED APPLICATIONS

This application is a continuation of U.S. patent application Ser. No. 15/819,717 filed Nov. 21, 2017, which claims priority under 35 U.S.C. § 119 to Japanese Patent Application No. 2016-229062 filed on Nov. 25, 2016, the entire content of which is hereby incorporated by reference.

BACKGROUND OF THE INVENTION

1. Field of the Invention

The present invention relates to a power source device.

2. Description of the Related Art

In the related art, a technology of storing a generated electric charge and providing the stored electric charge to a load as a current to operate the load is known (for example, refer to Japanese Unexamined Patent Application No. 2007-181278).

FIG. 5 is a diagram showing an example of a functional configuration of a power source device 100 of the related art. The power source device 100 includes a power generation element 10, a capacitor 20, a diode 110, a voltage detection circuit 30, a timer circuit TM, a logical multiplication circuit AND, a switch SW, and a voltage control circuit VR.

The power source device 100 supplies power generated by the power generation element 10 to a terminal T8 of a load LD. The power which is generated by the power generation element 10 and is output from a terminal T1 is supplied to the capacitor 20 as a current I1 flowing through a wire L1 and a current I2 flowing through a wire L2. The capacitor 20 accumulates electric charges generated by the power generation element 10. The storage power stored in the capacitor 20 is supplied to the voltage control circuit VR as a current I11. The capacitor 20 is grounded via a wire L3. The diode 110 prevents a backflow of a current from the capacitor 20 when the power generation element 10 does not generate electricity. The timer circuit TM controls time of an intermittent operation of supplying power to the load LD. The logical multiplication circuit AND outputs a logical multiplication of an output from a terminal T3 of the voltage detection circuit 30 and an output from the timer circuit TM. The switch SW is turned on and off by the output of the logical multiplication circuit AND. The voltage control circuit VR controls a voltage supplied to the load LD.

In the example shown in FIG. 5, the voltage detection circuit 30 detects a charged voltage of the capacitor 20 at a terminal T2 (voltage detection terminal). The switch SW is turned on when the charged voltage is equal to or higher than voltage which can operate the load LD and an output from the timer circuit TM is generated. The switch SW is turned on, and thus, the storage power of the capacitor 20 is supplied to the load LD via the voltage control circuit VR as a current I7.

Meanwhile, in the example shown in FIG. 5, the operation of the load LD on the storage power of the capacitor 20 decreases the charged voltage of the capacitor 20. When the charged voltage of the capacitor 20 becomes lower than the minimum operation voltage of the load LD, the load LD cannot operate. The load LD can thus operate as long as the charged voltage of the capacitor 20 is equal to or higher than the minimum operation voltage of the load LD.

In the example shown in FIG. 5, when the charged voltage of the capacitor 20 becomes lower than the minimum operation voltage of the load LD, the power stored in the capacitor 20 cannot be used anymore for the operation of the load LD. Accordingly, in the above-described case, the power stored in the capacitor 20 is wasted.

Considering the amount of the storage power which cannot be used for the operation of the load LD, the size of the entire power source device 100 consequently increases since it is necessary to adopt a larger capacitor for the capacitor 20 in the example shown in FIG. 5. In a case where the size of the capacitor 20 increases, a period during which the capacitor 20 is charged until the load LD can operate becomes longer after the capacitor 20 is discharged.

In the above-described related art, when the voltage of the storage power becomes lower than the voltage required for the operation of the load, the storage power cannot be used, and thus, becoming a waste.

An object of the present invention is to provide a power source device which can use more storage power.

SUMMARY OF THE INVENTION

In order to achieve the above-object, the present invention adopts the following aspects.

(1) According to an aspect of the present invention, there is provided a power source device, including: a storage unit configured to receive a generated power and store as a storage power; a boost unit configured to generate, from a storage power supplied from the storage unit, a boosted power having a higher voltage than a voltage of the storage power, and supply the boosted power to a load; and a voltage detection unit configured to output a boost operation permission signal permitting a boost operation of the boost unit to the boost unit when the storage voltage of the boost unit increases to become a voltage equal to or higher than a minimum operation voltage of the boost unit, the boost unit being configured to start the boost operation by the storage power supplied from the storage unit and operating on the boosted power generated by the boost operation as an operation power source when the boost operation permission signal is output from the voltage detection unit.

(2) In the power source device according to the above (1), a power consumption of the voltage detection unit may be smaller than a power consumption of the boost unit.

(3) The power source device according to the above (1) or (2) may further include a second boost unit configured to generate, from the storage power supplied from the storage unit, a second boosted power having voltage which is higher than the voltage of the storage power and is equal to or higher than the minimum operation voltage of the boost unit, and supply the generated second boosted power as an operation power source of the boost unit.

According to the above-described aspects, it is possible to provide the power source device which can use more storage power.

DETAILED DESCRIPTION OF THE PREFERRED EMBODIMENTS

First Embodiment

Hereinafter, embodiments of a power source device 1 will be described with reference to the drawings.

Figure 1:
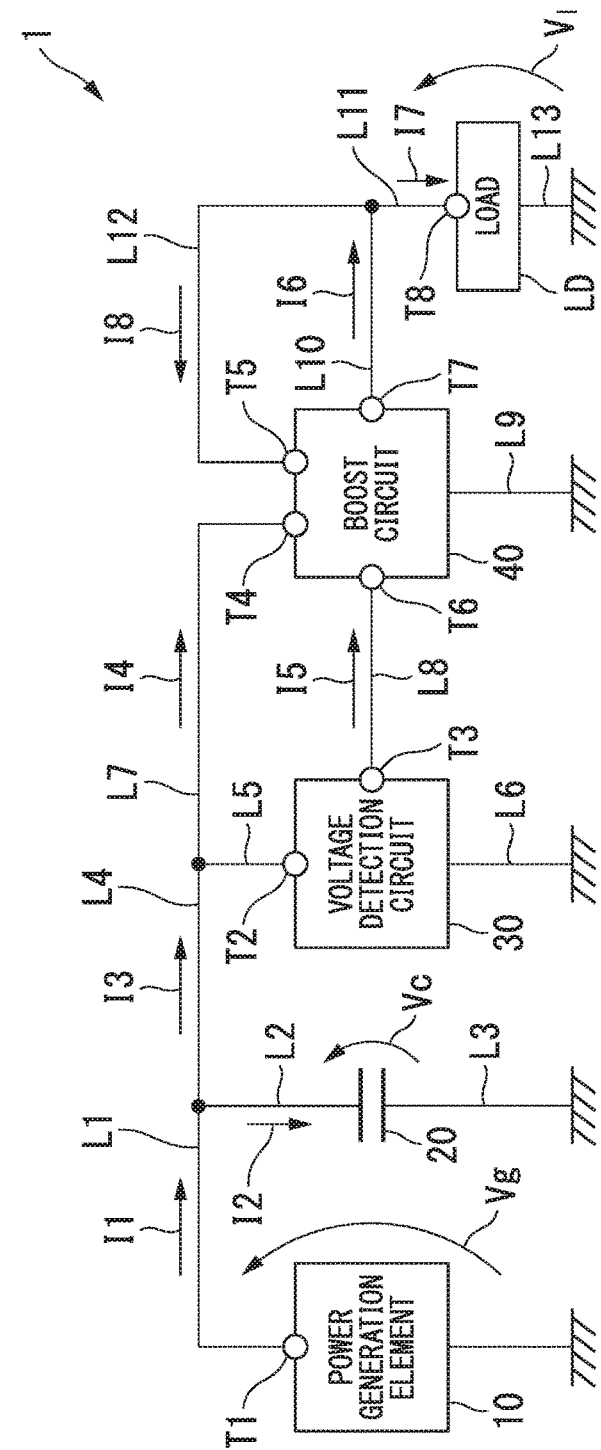
FIG. 1 is a diagram showing an example of a functional configuration of a power source device according to a first embodiment of the present invention.

FIG. 1 is a diagram showing an example of a functional configuration of the power source device 1 according to the first embodiment. The power source device 1 includes a capacitor 20 which functions as a storage unit, a voltage detection circuit 30 which functions as a voltage detection unit, and a boost circuit 40 which functions as a boost unit. The power source device 1 supplies power generated by a power generation element 10 to a load LD. The power generation element 10 is, for example, a solar cell, a thermoelectric conversion element, a power generation element by electromagnetic induction, or the like. The power generation element 10 has an electromotive force of a generated voltage Vg. The load LD is, for example, a wireless communication module. In the case of the example, the power source device 1 is provided in a portable apparatus which can perform wireless communication and supplies power generated by the power generation element 10 such as a solar cell to the load LD such as a wireless communication module.

The capacitor 20 stores the power generated by the power generation element 10. Hereinafter, the power generated by the power generation element 10 is referred to as generated power.

In this example, the generated power is smaller than power consumption of the load LD. In this case, when the generated power is supplied to the load LD as it is, the load LD does not operate. The power source device 1 supplies power with which the load LD can operate to the load LD by storing the generated power to the capacitor 20.

More specifically, the power generation element 10 outputs the generated power from a terminal T1. The generated power is supplied to the capacitor 20 as a current I1 flowing through a wire L1 and a current I2 flowing through a wire L2. The capacitor 20 stores the supplied current I2 as storage power when the current I2 is supplied. The voltage of the storage power stored in the capacitor 20 is determined according to an electrostatic capacity of the capacitor 20 and a charge amount of the current I2 supplied from the power generation element 10.

Here, the voltage of the storage power stored in the capacitor 20 is referred to as the storage voltage Vc. Supply of the current I2 to the capacitor 20 increases the storage voltage Vc with the generated voltage Vg of the electromotive force of the power generation element 10 as an upper limit.

The storage power stored in the capacitor 20 is supplied to the boost circuit 40 as a current I3 flowing through a wire L4 and a current I4 flowing through a wire L7. The capacitor 20 is grounded via a wire L3.

The voltage detection circuit 30 detects the storage voltage Vc. When the storage voltage Vc increases and becomes equal to or higher than the minimum operation voltage of the boost circuit 40, the voltage detection circuit 30 outputs a boost operation permission signal I5 to the boost circuit 40. This boost operation permission signal I5 is a signal which permits (or does not permit) a boost operation of the boost circuit 40.

Specifically, the voltage detection circuit 30 includes a terminal T2 (voltage detection terminal) and a terminal T3 (boost operation permission signal output terminal). The voltage detection circuit 30 detects voltage of the wire L4 connected to the terminal T2 via the wire L5, that is, the storage voltage Vc. The voltage detection circuit 30 includes a voltage comparator (not shown) therein and compares the detected storage voltage Vc and a threshold voltage. The threshold voltage is set to be equal to or higher than the minimum operation voltage of the boost circuit 40. For example, in a case where the minimum operation voltage of the boost circuit 40 is 1.0 V (volt), the threshold voltage is set to 1.1 [V].

When the detected storage voltage Vc is equal to or higher than the threshold value, the voltage detection circuit 30 outputs the boost operation permission signal I5 to the terminal T3. The output boost operation permission signal I5 is supplied to the boost circuit 40 via a wire L8. The voltage detection circuit 30 is grounded via a wire L6.

The boost circuit 40 generates boosted power having a higher voltage than the voltage of the supplied power. That is, the boost circuit 40 boosts the supply power. The boost circuit 40 supplies the generated power to the load LD.

The boost circuit 40 is, in this example, a boost chopper type voltage conversion circuit. The boost circuit 40 is not limited only to the boost chopper type voltage conversion circuit, and for example, may be a charge pump type voltage conversion circuit.

More specifically, the boost circuit 40 includes a terminal T4 to a terminal T7. The terminal T4 is a power input terminal to which the power output from the capacitor 20 is supplied. The terminal T5 is a power source terminal to which the power for the boost circuit 40 to perform the boost operation is supplied. The terminal T6 is a boost operation permission signal detect terminal to which the boost operation permission signal I5 output from the voltage detection circuit 30 is supplied. The terminal T7 is a boosted power output terminal from which the boosted power boosted by the boost circuit 40 is output.

The boost circuit 40 starts or stops the boost operation according to the voltage of the boost operation permission signal I5 supplied to the terminal T6. For example, in a case where the boost operation permission signal I5 is a high potential (High), the boost operation permission signal I5 indicates "permission to boost". In a case where the boost operation permission signal I5 is a low potential (Low), the boost operation permission signal I5 indicates "non-permission to boost".

In the case where the boost operation permission signal I5 indicates the "non-permission to boost", the boost circuit 40 does not perform the boost operation. In this case, the storage power supplied to the boost circuit 40 from the capacitor 20 is not boosted and is output from the terminal T7. Hereinafter, the power which is not boosted by the boost circuit 40 is referred to as the non-boosted power.

In the case where the boost operation permission signal I5 indicates "permission to boost", the boost circuit 40 performs the boost operation. In this case, the storage power supplied to the boost circuit 40 from the capacitor 20 is boosted and is output from the terminal T7. Here, the power which is boosted by the boost operation of the boost circuit 40 is referred to as the boosted power.

That is, the power output from the boost circuit 40 is the non-boosted power or the boosted power.

The power output from the boost circuit 40 is supplied to a terminal T8 of the load LD as a current I6 flowing through a wire L10 and a current I7 flowing through a wire L11. The power output from the boost circuit 40 is supplied to the terminal T5 (power source terminal) as a current I8 flowing through a wire L12. The power output from the boost circuit 40 is thus supplied to the load LD and the power source terminal of the boost circuit 40. That is, the boost circuit 40 performs the boost operation with the power output from the boost circuit 40 as a power source.

The boost circuit 40 is grounded via a wire L9. The load LD is grounded via a wire L13.

Outline of Operation of Boost Circuit 40

Here, an outline of an operation of the boost circuit 40 will be described. In a case where the storage voltage Vc is low and does not reach the minimum operation voltage of the boost circuit 40, the voltage detection circuit 30 outputs a boost operation permission signal I5 indicating the "non-permission to boost". In this case, the boost circuit 40 does not perform the boost operation. Power with the voltage equivalent to the storage voltage Vc, that is, non-boosted power is supplied to the terminal T5 (power source terminal) of the boost circuit 40.

When the storage voltage Vc is increased by the power generation of the power generation element 10 and reaches the minimum operation voltage of the boost circuit 40, the boost circuit 40 reaches a state capable of performing the boost operation. However, the boost circuit 40 does not perform the boost operation while the voltage detection circuit 30 outputs the boost operation permission signal I5 indicating the "non-permission to boost".

When the storage voltage Vc is further increased by the power generation of the power generation element 10 and the storage voltage Vc is equal to or higher than the threshold value of the voltage detection circuit 30, the voltage detection circuit 30 outputs the boost operation permission signal I5 indicating the "permission to boost". In this case, the boost circuit 40 starts the boost operation. As described above, the threshold value is set to voltage equal to or higher than the minimum operation voltage of the boost circuit 40.

When the boost circuit 40 starts the boost operation, boosted power is supplied to the load LD and the terminal T5 (power source terminal) of the boost circuit 40. After the boost circuit 40 starts the boost operation, the boost circuit 40 operates at the boosted power.

Once the boosted power is supplied to the load LD, the boosted power supplied to the load LD is consumed. As described above, in this example, the generated power of the power generation element 10 is smaller than the power consumption of the load LD. Accordingly, even in a case where the power generation element 10 continues the power generation, consumption of the boosted power by the load LD decreases the storage power stored in the capacitor 20. In a case where the power generation element 10 does not perform the power generation, consumption of the boosted power by the load LD largely decreases the storage power stored in the capacitor 20.

Decrease of the storage power in the capacitor 20 decreases the storage voltage Vc.

The boost circuit 40 holds the voltage of the boosted power at a constant voltage regardless of the voltage of the supplied storage voltage Vc. The voltage of the boosted power is set to be equal to or higher than the minimum operation voltage of the boost circuit 40. Accordingly, even in a case where the storage voltage Vc becomes lower than the minimum operation voltage of the boost circuit 40, the voltage equal to or higher than the minimum operation voltage of the boost circuit 40 is supplied to the boost circuit 40 as operation power. That is, as long as the storage power of the storage voltage Vc is not consumed, even when the storage voltage Vc decreases, the boost circuit 40 can continue the boost operation.

Specific Example of Boost Circuit 40

Next, a specific example of the boost circuit 40 will be described with reference to FIG. 2.

Figure 2:
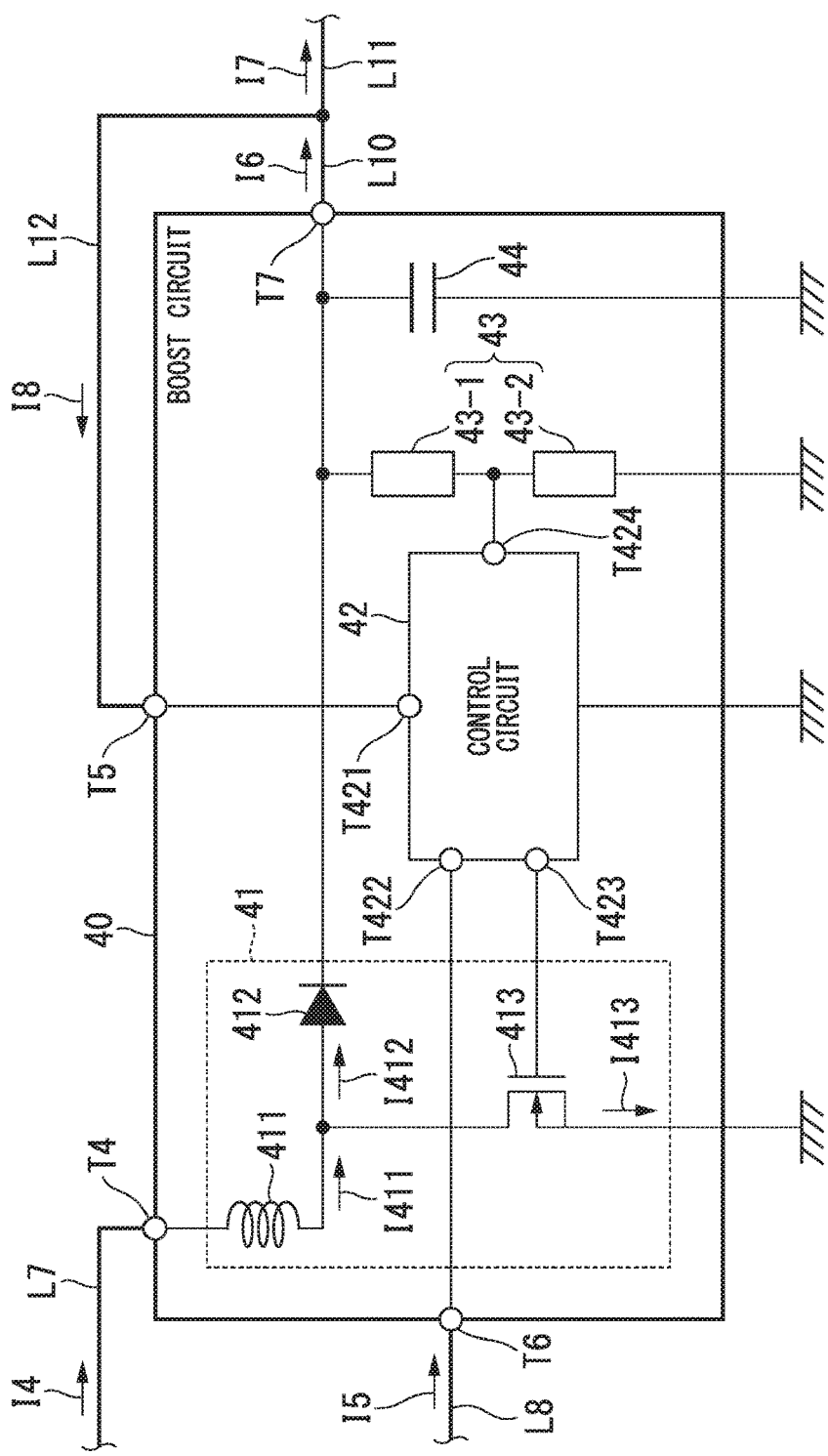
FIG. 2 is a diagram showing an example of a circuit configuration of a boost circuit of the first embodiment.

FIG. 2 is a diagram showing an example of a circuit configuration of the boost circuit 40 of the present embodiment. The same reference numerals are assigned to the same configurations as those of FIG. 1 and descriptions thereof are omitted.

The boost circuit 40 includes a boost chopper circuit 41, a control circuit 42, a bleeder resistor 43 having a resistor 43-1 and a resistor 43-2, and an output capacitor 44.

The boost chopper circuit 41 includes an inductor 411, a diode 412, and a transistor switch 413. The circuit configuration of the boost chopper circuit 41 is known, and thus, descriptions thereof are omitted. The current I6 output from the boost chopper circuit 41 is supplied to the outside of the boost circuit 40 from the terminal T7 as output power. A portion of the output power is supplied to the boost circuit 40 via the terminal T5.

The control circuit 42 controls the boost operation by driving the boost chopper circuit 41. The control circuit 42 acquires the boost operation permission signal I5 via a terminal T422. In a case where the acquired boost operation permission signal I5 indicates the "permission to boost", the control circuit 42 performs the boost operation. Specifically, the control circuit 42 outputs signals to turn on and off the transistor switch 413 to the transistor switch 413 via a terminal T423. In a case where the transistor switch 413 is turned on, a current I411 flowing through the inductor 411 flows to the transistor switch 413 as a current I413. In a case where the transistor switch 413 is turned off, the current I411 flowing through the inductor 411 flows to the diode 412 as a current I412.

The control circuit 42 monitors the voltage of the output power via the bleeder resistor 43 and the terminal T424 and controls the voltage of the output power (that is, boosted power) to be constant during the boost operation.

The output capacitor 44 stabilizes the voltage value of the output power.

In FIG. 2, the boost circuit 40 has a circuit configuration in which the power output from the terminal T7 is supplied to the control circuit 42 via the terminal T5. However, the present invention is not limited only to this configuration. The boost circuit 40 may have a circuit configuration in which the power output from the boost chopper circuit 41 is supplied to the terminal T421 before the terminal T7 for boosted power output. According to this configuration, in the boost circuit 40, the terminal T5, that is, the power source terminal can be omitted.

In FIG. 2, the boost circuit 40 has the output capacitor 44. However, the present invention is not limited to this configuration. The output capacitor 44 may have a circuit configuration which is connected to the outside (for example, wire L10) of the boost circuit 40.

Specific Example of Operation of Power Source Device 1

Next, a specific example of the operation of the power source device 1 will be described with reference to FIG. 3A through FIG. 3D.

FIG. 3A through FIG. 3D are diagrams showing an example of an operation waveform of the power source device 1 of the present embodiment. In FIG. 3A through FIG. 3D, a horizontal axis indicates time t. The vertical axis in FIG. 3A indicates the generated voltage Vg of the power generation element 10. The vertical axis in FIG. 3B indicates the storage voltage Vc of the capacitor 20. The vertical axis in FIG. 3C indicates the potential of the boost operation permission signal I5. The vertical axis in FIG. 3D indicates voltage of the output power of the boost circuit 40, that is, an output voltage V1.

At time t0, as shown by a waveform W1, the generated voltage Vg of the power generation element 10 becomes voltage V1. At this time, the storage voltage Vc of the capacitor 20 is zero. At this time, the boost operation permission signal I5 indicates a low potential (Lo), that is, indicates the non-permission to boost. At this time, the output voltage V1 is zero.

From time t0 to time t1, continuous power generation in the power generation element 10 enables storage of the generated power in the capacitor 20, increasing the storage voltage Vc. The output voltage V1 increases according to the increase of the storage voltage Vc.

From time t0 to time t1, the boost operation permission signal I5 is the low potential (Lo), that is, the non-permission to boost, and thus, the boost circuit 40 does not perform the boost operation. Accordingly, from time t0 to time t1, the output voltage V1 is equal to the storage voltage Vc.

At time t1, when the storage voltage Vc reaches the voltage V2, the voltage detection circuit 30 changes the boost operation permission signal I5 to the high potential (High), that is, the "permission to boost", making the boost circuit 40 start the boost operation. The output voltage V1 increases to voltage V5 according to the start of the boost operation.

Here, the voltage V2 is a start threshold voltage of the boost operation. The voltage V3 is the minimum operation voltage of the boost circuit 40. The threshold voltage of the voltage detection circuit 30 is set to be equal to or higher than the minimum operation voltage of the boost circuit 40.

Thereafter, while the boost operation permission signal I5 indicates the "permission to boost", the output voltage V1 is held at a constant value (voltage V5) by the boost operation of the boost circuit 40. In this example, from time t1 to time t4, the output voltage V1 is held at a constant value (voltage V5).

From time t1 to time t4, the storage power of the capacitor 20 is consumed by the load LD, the storage voltage Vc decreases.

In this example, the power generation element 10 continuously generates power from time t1 to time t2. After time t2, the power generation element 10 does not generate power. Accordingly, in this example, the storage voltage Vc relatively gently decreases from time t1 to time t2, and the storage voltage Vc relatively sharply decreases after time t2.

At time t4, the storage voltage Vc reaches the voltage V4. The voltage V4 is a stop threshold voltage of the boost operation. When the voltage detection circuit 30 detects that the storage voltage Vc reaches the voltage V4, the voltage detection circuit 30 switches the boost operation permission signal I5 to the low potential (Lo), that is, the "non-permission to boost". Accordingly, the boost circuit 40 stops the boost operation. The output voltage V1 is equal to the storage voltage Vc by the stop of the boost operation.

Here, the minimum operation voltage of the load LD is voltage V6. The load LD can operate from time t1 to time t4. In this example, the minimum operation voltage (voltage V6) of the load LD is higher than the minimum operation voltage (V3) of the boost operation of the boost circuit 40.

Here, attention is paid to time t3. At time t3, the storage voltage Vc decreases and reaches the voltage V3, that is, the minimum operation voltage of the boost circuit 40. Suppose that the boost circuit 40 performs the boost operation with the storage voltage Vc as an operation power source. In this case, at time t3, the boost circuit 40 cannot operate and thus, the boost operation of the boost circuit 40 stops.

That is, in a case where the boost circuit 40 performs the boost operation with the storage voltage Vc as the operation power source, possible operation time of the load LD is from time t1 to time t3.

Meanwhile, the boost circuit 40 of the present embodiment performs the boost operation with the output voltage V1 as the operation power source. In this case, possible operation time of the load LD is from time t1 to time t4. That is, by setting the operation power source of the boost operation of the boost circuit 40 to the output voltage V1, it is possible to further lengthen the operation time of the load LD.

This means that, compared to a case where the boost circuit 40 does not have the output voltage V1 as the operation power source, according to the power source device 1 of the present embodiment, more storage power stored in the capacitor 20 can be used.

As described above, according to the power source device 1 of the first embodiment, when the boost operation permission signal I5 indicating the "permission to boost" is output from the voltage detection circuit 30, the boost circuit 40 starts the boost operation by the storage power supplied from the capacitor 20 and operates on the boosted power generated by the boost operation as the operation power source. Accordingly, more storage power can be used.

In the power source device 1 of the first embodiment, the power consumption of the voltage detection circuit 30 which is always in operation is smaller than the power consumption of the boost circuit 40 which is not always in operation, and thus, it is possible to decrease the entire power consumption of the power source device 1.

In the power source device 1 of the first embodiment, when the boost operation permission signal I5 indicating the "permission to boost" is not output from the voltage detection circuit 30 to the boost circuit 40, the boost circuit 40 does not start the boost operation. It is thus possible to suppress a likelihood of falling into unstable state in which the boost circuit 40 cannot continue the boost operation after the start of the boost operation of the boost circuit 40.

Figure 3:
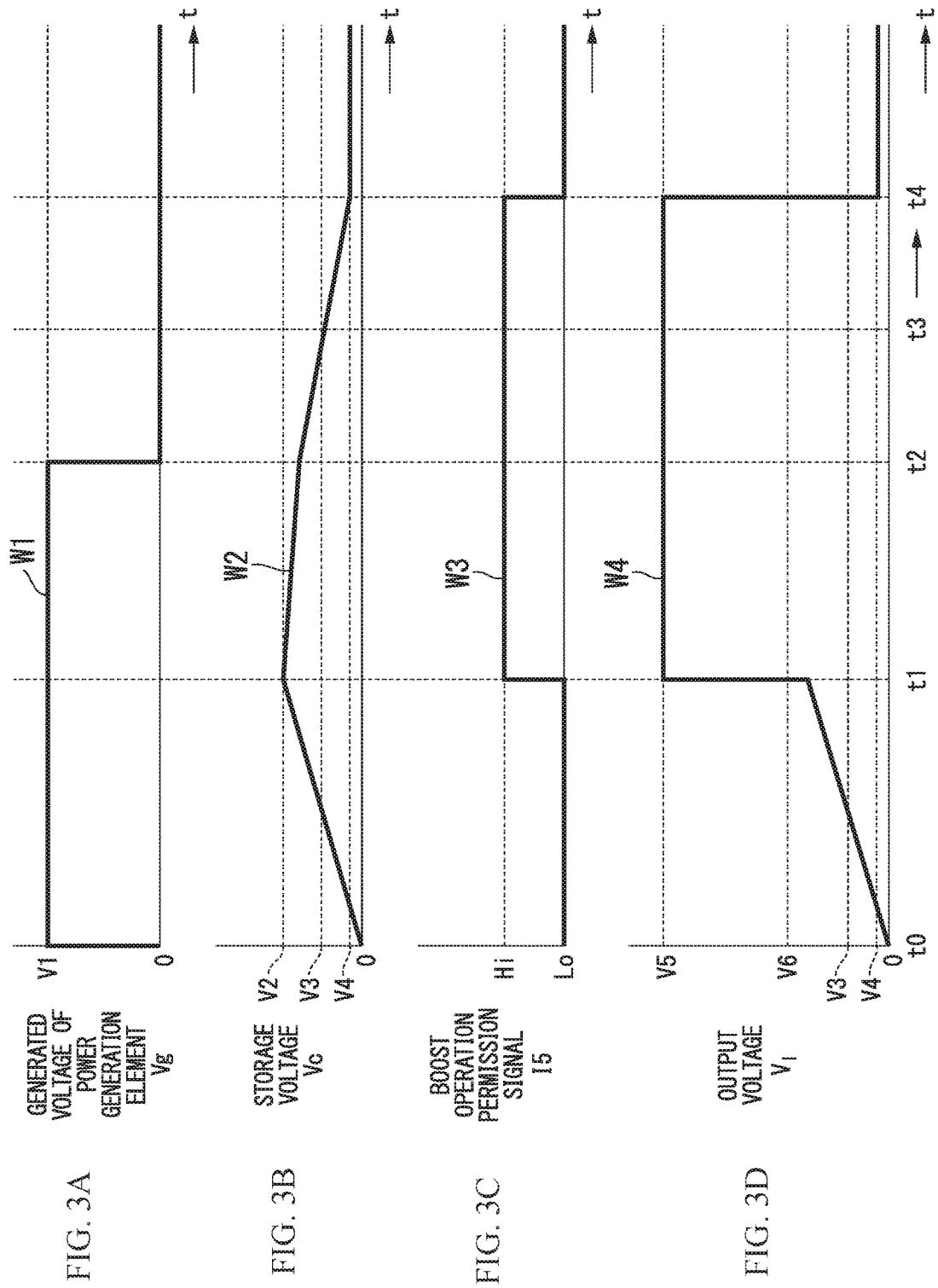
FIG. 3A through FIG. 3D are diagrams showing an example of an operation waveform of the power source device of the first embodiment.

In the power source device 1 of the first embodiment, as shown in FIG. 3B, the storage power of the capacitor 20 can be used for the operation of the load LD until the storage voltage Vc of the capacitor 20 decreases to the voltage V4. Accordingly, it is possible to decrease a size of the capacitor 20. In addition, since there is almost no waste storage power, it is possible to shorten a charging period (the period t0 to t1 in FIG. 3B) of the capacitor 20.

Second Embodiment

Figure 4:
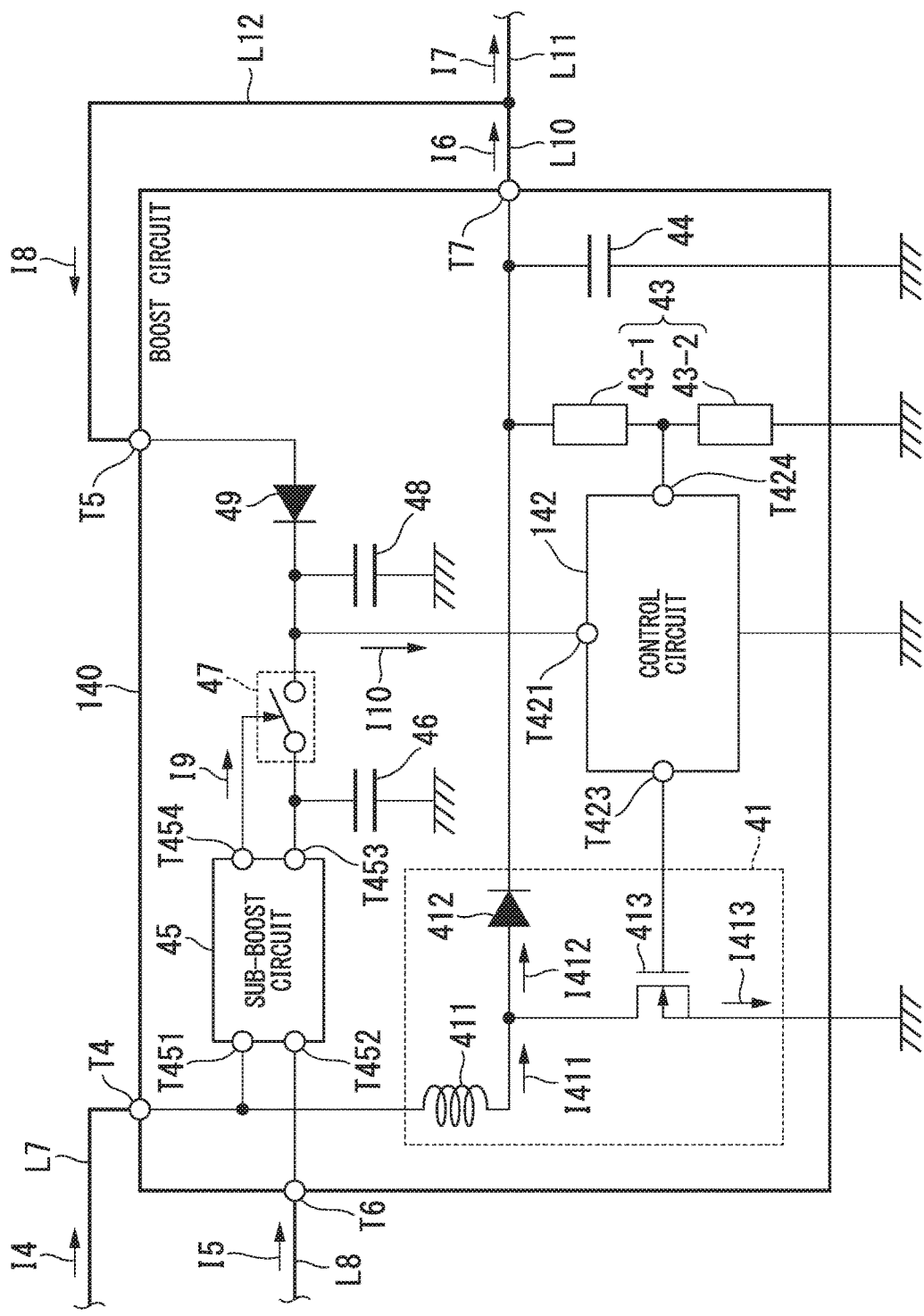
FIG. 4 is a diagram showing an example of a functional configuration of a power source device according to a second embodiment of the present invention.
Figure 5:
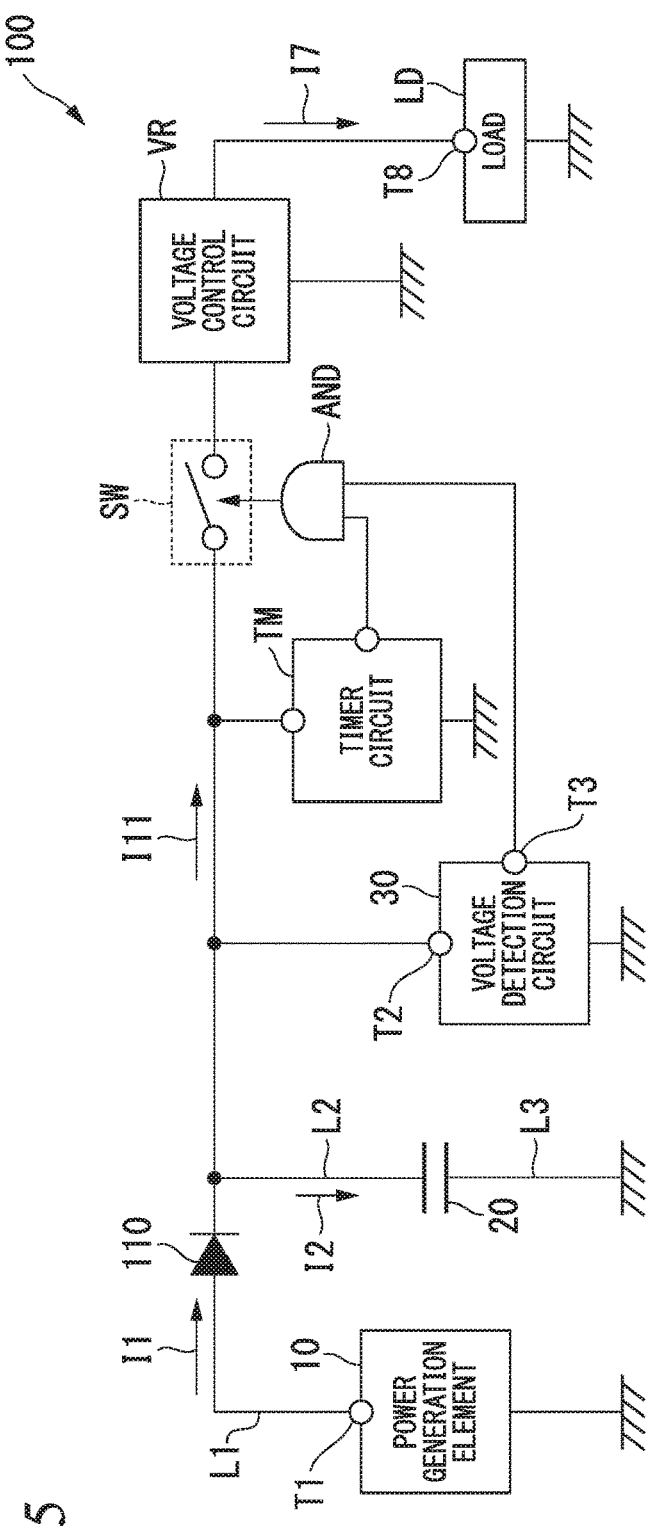
FIG. 5 is a diagram showing an example of a functional configuration of a power source device of the related art.

Next, a second embodiment of the present invention will be described with reference to FIG. 4. The same reference numerals are assigned to configurations and operations similar to those of the above-described first embodiment, and descriptions thereof are omitted. A boost circuit 140 of the second embodiment is different from the boost circuit 40 of the first embodiment in that a sub-boost circuit 45 is provided.

The boost circuit 140 includes the sub-boost circuit 45, a capacitor 46, a transistor switch 47, a capacitor 48, and a diode 49.

The sub-boost circuit 45 boosts the storage voltage Vc of the storage power supplied from the capacitor 20 to the terminal T4. The sub-boost circuit 45 is, for example, a flying capacitor type boost circuit. The sub-boost circuit 45 boosts the storage voltage Vc supplied to a terminal T451

(power input terminal) and outputs the boosted storage voltage Vc from a terminal T453 (power output terminal).

The capacitor 46 is connected to the terminal T453 and stores the power boosted by the sub-boost circuit 45.

The sub-boost circuit 45 switches an output of a terminal T454 (switch control terminal) based on the storage voltage of the capacitor 46. In a case where the power required to drive the control circuit 142 is not accumulated in the capacitor 46, the sub-boost circuit 45 turns off the transistor switch 47. Accordingly, the power stored in the capacitor 46 is not supplied to the control circuit 142. The operating voltage of the sub-boost circuit 45 is lower than the operating voltage of the boost circuit 140.

When the voltage detection circuit 30 detects that the capacitor 20 is charged to the storage voltage Vc capable of driving the sub-boost circuit 45, the boost operation permission signal I5 of the "permission to boost" is supplied to the terminal T452. When the boost operation permission signal I5 supplied to the terminal T452 becomes the "permission to boost", the sub-boost circuit 45 converts the storage power to the boosted power and the capacitor 46 stores this boosted power.

In a case where the power required to drive the control circuit 142 is accumulated in the capacitor 46, the sub-boost circuit 45 turns on the transistor switch 47 by a current I9. Accordingly, the power stored in the capacitor 46 is output to the control circuit 142 as a current I10. Turning on the transistor switch 47 starts the boost operation of the control circuit 142.

The diode 49 prevents the inflow of the discharged power from the capacitor 46 to the load LD side caused by turning on of the transistor switch 47. After the control circuit 142 is driven, a portion of the boosted power generated at the output terminal T7 is supplied to the power source terminal T421 of the control circuit 142 via the diode 49.

The capacitor 48 stabilizes the power source voltage of the control circuit 142.

Here, in the first embodiment, the power source voltage in the case where the control circuit 42 starts the boost operation is the storage voltage Vc. Accordingly, in the first embodiment, the storage voltage Vc should be equal to or higher than the minimum operation voltage of the boost operation of the control circuit 42.

Meanwhile, according to the boost circuit 140 of the present embodiment, even when the storage voltage Vc supplied to the boost circuit 140 becomes lower than the minimum operation voltage of the boost operation of the control circuit 142, the control circuit 142 can start the boost operation. That is, according to the boost circuit 140, the storage voltage Vc can be reduced to be lower than the minimum operation voltage of the boost operation of the control circuit 142.

Here, in a case where the capacitor 20 is a so-called electric double layer capacitor (EDLC), preferably, the storage voltage Vc is around 0.5 to 0.6 [V]. This is because, for example, when the storage voltage Vc of the electric double layer capacitor exceeds 0.8 [V], a lifetime of the electric double layer capacitor shortens.

In general, it is difficult to set the minimum operation voltage of the boost operation of the boost circuit 140 to around 0.5 to 0.6 [V]. For example, in a case where the minimum operation voltage of the boost operation of the boost circuit 140 is 1.0 [V], according to the circuit configuration of the first embodiment, the electric double layer capacitor having a relatively low storage voltage Vc cannot be selected as the capacitor 20.

Meanwhile, according to the circuit configuration of the present embodiment, the sub-boost circuit 45 is provided, and thus, even when the electric double layer capacitor having a relatively low storage voltage Vc is selected as the capacitor 20, the storage voltage Vc can be boosted to be equal to or higher than the minimum operation voltage of the boost operation of the control circuit 142.

That is, according to the boost circuit 140 of the present embodiment, the electric double layer capacitor having a relatively low storage voltage Vc or the like can be selected as the capacitor 20. The electric double layer capacitor has a larger capacity than those of other kinds of capacitors, and thus, more electric charges can be stored. That is, according to the boost circuit 140 of the present embodiment, it is possible to further lengthen an operation time of the load LD.

As described above, in the example shown in FIG. 4, the flying capacitor type boost circuit is used as the sub-boost circuit 45. In another example, a charge pump type boost circuit including a boost capacitor can be used as the sub-boost circuit 45. Specifically, in this example, by driving the control circuit 142 mainly using the power of the capacitor 46, conversion ability of the sub-boost circuit 45 is set to a small value. Accordingly, the charge pump type boost circuit including a boost capacitor can be used as the sub-boost circuit 45. As a result, it is possible to decrease the size of the sub-boost circuit 45 and to reduce the cost.

As described above, the power source device 1 of the second embodiment has configurations similar to those of the power source device 1 of the first embodiment, and thus, in the power source device 1 of the second embodiment, effects similar to those of the power source device 1 of the first embodiment can be exerted. The power source device 1 of the second embodiment includes the sub-boost circuit 45 which functions as the second boost unit. The sub-boost circuit 45 generates second boosted power having voltage which is higher than the voltage of the storage power and is equal to or higher than the minimum operation voltage of the boost circuit 140 which is the boost unit, from the storage power supplied from the capacitor 20 which is the storage unit, and the sub-boost circuit 45 supplies the generated second boosted power as the operation power source of the control circuit 142 of the boost circuit 140. Accordingly, the boost start voltage of the boost circuit 140 can be reduced.

In the power source device 1 of the second embodiment, the maximum value of the storage voltage Vc of the capacitor 20 is suppressed to the drive voltage of the sub-boost circuit 45. Therefore, as the capacitor 20, it is possible to use the electric double layer capacitor which deteriorates when the storage voltage is high. The size of the electric double layer capacitor is small while the capacity is large, and thus, it is possible to decrease the size of the entire power source device 1 by using the electric double layer capacitor.

Embodiments of the present invention and modifications thereof are explained in the above; however, it should be understood that these are exemplary of the invention and are not to be considered as limiting. These embodiments and modifications can be performed in other various ways; therefore, additions, omissions, substitutions, and other modifications can be made without departing from the scope of the invention. These embodiments and modifications are included in the scope of the invention described in the claims and equivalence thereof. Furthermore, the embodiments and the modifications can be combined with each other.

What is claimed is:

1. A power source device, comprising:
a power storage configured to receive and store electrical power generated by a power generator;
a voltage booster configured to boost the electrical power stored in the power storage to a boosted electrical power having a voltage higher than a voltage of the electrical power stored in the power storage, the voltage booster further configured to receive a boost permission signal and, solely during reception of the boost permission signal, supply the boosted electrical power to a load; and
a voltage detector configured to monitor the voltage of the electrical power stored in the power storage and, in response to detection that the voltage of the electrical power stored in the power storage is equal to or higher than a minimum operation voltage of the voltage booster, supply the boost permission signal to the voltage booster.

2. The power source device according to claim 1, wherein the voltage detector is configured to consume power for operation of the voltage detector at a level lower than a level at which the voltage booster consumes power for operation of the voltage booster.

3. The power source device according to claim 1, further comprising a second voltage booster configured to boost the electrical power stored in the power storage to a second boosted electrical power having a second voltage that is higher than the voltage of the electrical power stored in the power storage and is equal to or higher than the minimum operation voltage of the voltage booster, and the second voltage booster further configured to supply the second boosted electrical power to the voltage booster for operation of the voltage booster.

4. The power source device according to claim 1, wherein the voltage detector is configured to turn off the boost permission signal in response to detection that the voltage of the electrical power stored in the power storage is equal to or lower than a second voltage that is lower than the minimum operation voltage of the voltage booster, and the voltage booster is configured to supply the electrical power stored in the power storage to the load without boosting the electrical power stored in the power storage while the boost permission signal is turned off.

5. The power source device according to claim 1, further comprising a separator configured to supply part of the boosted electrical power to the load and a rest of the boosted electrical power back to the voltage booster for operation of the voltage booster.

6. The power source device according to claim 3, wherein the second voltage booster configured to monitor the voltage of the electrical power stored in the power storage and in response to detection that the voltage of the electrical power stored in the power storage is equal to or higher than a third voltage that is lower than the minimum operation voltage of the voltage booster, supply the second boosted electrical power to the voltage booster solely while the voltage of the electrical power stored in the power storage is equal to or higher than a third voltage.

* * * * *